July 12, 1949.  E. C. KARP  2,476,046
SCALE CHART
Filed Nov. 9, 1945  2 Sheets-Sheet 1
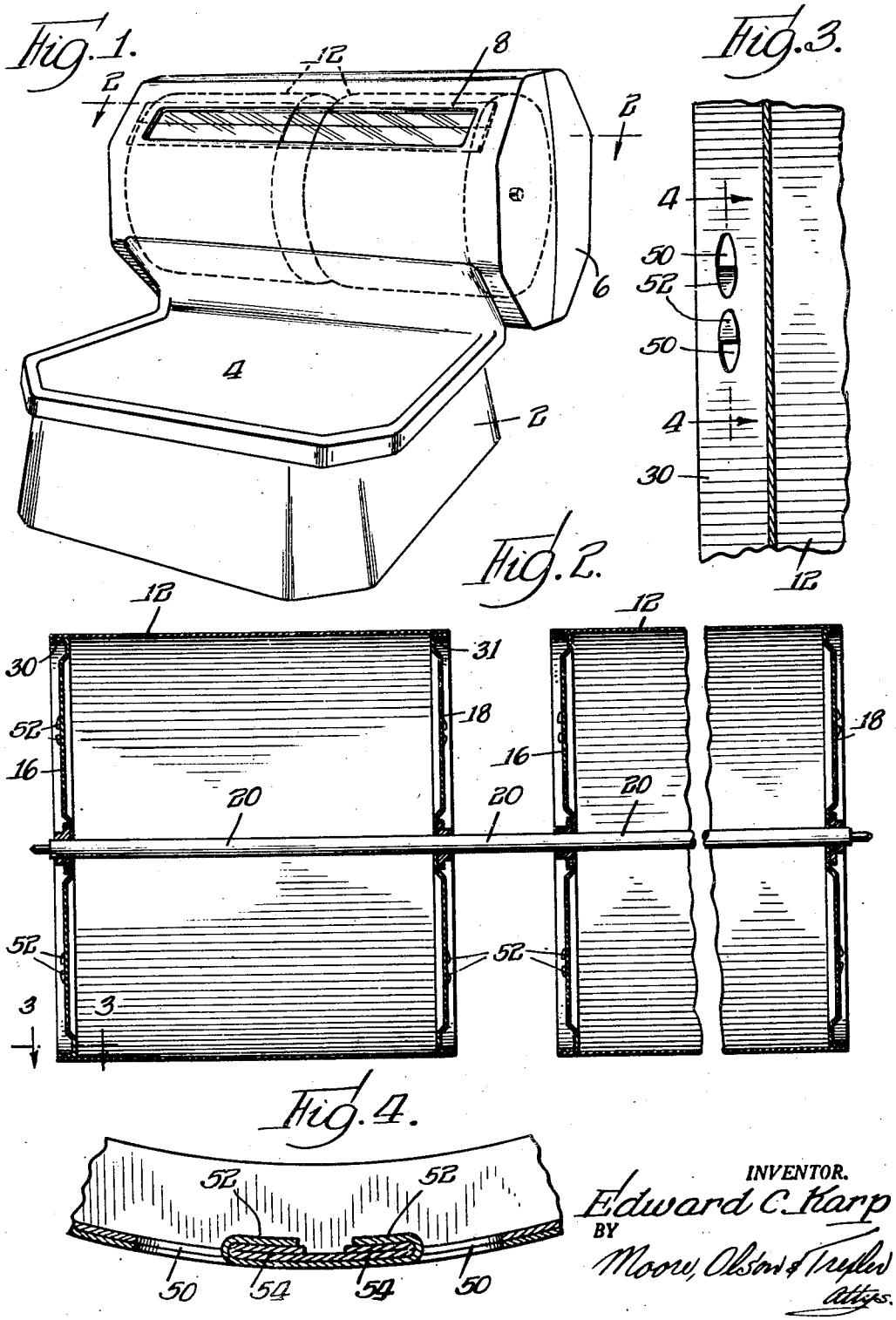
INVENTOR.
Edward C. Karp
BY
Moore, Olson & Trexler
attys.

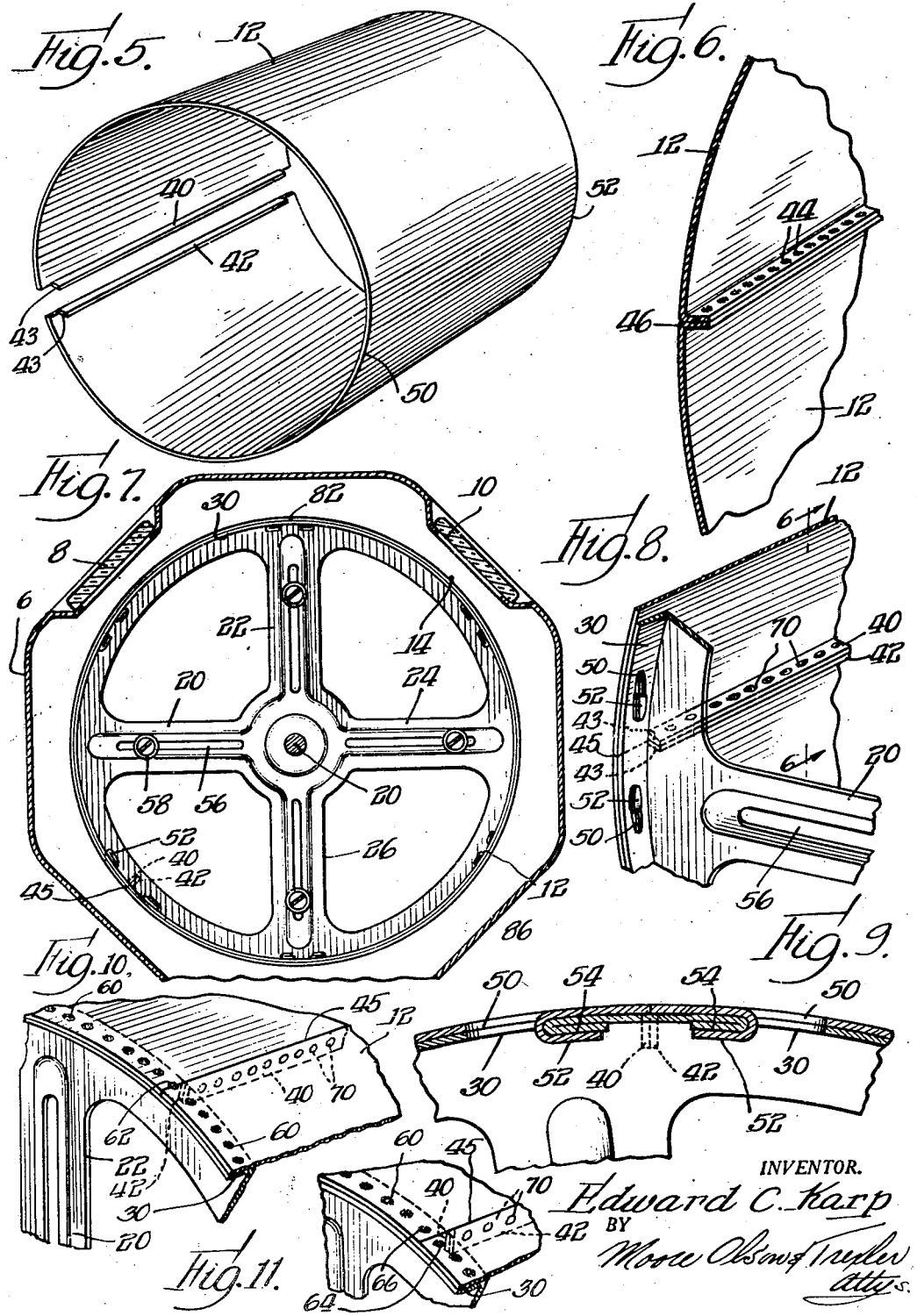

Patented July 12, 1949

2,476,046

UNITED STATES PATENT OFFICE 2,476,046

SCALE CHART

Edward C. Karp, Belvidere, Ill., assignor to Sanitary Scale Company, Belvidere, Ill., a corporation of Illinois Application November 9, 1945, Serial No. 627,748

7 Claims. (Cl. 116—129)

This invention relates to a chart for scales. The invention is concerned particularly with a chart of the drum type wherein the cylindrical surface of the drum upon which the indicia is provided is formed of a sheet of metal such as aluminum or the like.

Among the objects of the present invention is to provide such a chart constructed so that the ends of the chart are united by spot welding to form the complete drum so that the juncture will not be raised above the surface of the remaining portions of the drum, whereby the sight wire can be placed in close proximity to the surface of the drum.

Another object of the present invention is to provide means for uniting together the ends of the light gauge sheet metal of which the drum is composed so that they will be united in such manner as not to disturb the indicia tabulations printed on the outer surface of the drum, and yet at the same time will form a perfect, strong and enduring junction, and particularly one which will permit the placement of the sight wire so close to the outer surface of the drum, without touching it, that efficient reading of the indicia will be assured and whereby the junction portion which overlies the rims of the supporting spider will not be elevated above the remaining portions of the junction portion of the drum.

Yet another object of the invention resides in providing a simple type of means for uniting the circumferential end portions of the drum to the spider flange in a manner which will not disturb the correct reading of the indicia on the drum but which at the same time will firmly unite the drum to the spider flanges.

Another object of the invention resides in providing a method of forming a chart or scale formed of light gauge metal, such for instance as aluminum.

A further object of the invention is to provide an improved chart for a scale and the method of making the same wherein those edge portions of the ends of the chart which overlie the flanges of the spiders are arranged in abutting relation on each side of an intermediate seamed portion of the chart ends, said circumferential edge portions of the chart being spot welded or welded to the underlying spider flanges in such a manner that the metal of the overlying circumferential edges of the chart and that of the flanges interflows, and particularly wherein the metal at the abutting edges interflows with that of the underlying chart whereby more securely to hold the abutting edges together and also to the underlying flanges.

Still another object of the invention resides in providing the spot welding relatively close to the abutting edges of the circumferential edge portions of the chart which overlie the spider flanges, said spot welding portions causing the metal of the underlying portions to interflow with the metal of the spider flanges whereby to fix the chart to the spider flanges circumferentially of the flanges and also more intimately relatively close to the abutting edges and thereby fixing the chart circumferential edges to the flanges, and also thereby holding the chart ends securely.

Other and further objects of the invention will be apparent from a perusal of the following specification when taken in connection with the accompanying drawings, wherein:

Figure 1 is a view of one type of scale embodying the features of the present invention;

Figure 2 is a cross sectional view taken on the line 2—2 of Figure 1, showing a cross sectional view of the chart drum;

Figure 3 is a view showing one manner in which the circumferential marginal edges of the drum are secured to the spider flanges;

Figure 4 is a section on line 4—4 of Figure 3;

Figure 5 is a perspective view of the chart sheet before the edges thereof are united;

Figure 6 is a cross sectional view taken on the line 6—6 of Figure 8;

Figure 7 is a view showing the chart in position within the chart housing;

Figure 8 is a perspective interior view of the chart assembly showing the inturned portions of the seam cut away so that the cylindrical portions of the chart may overlie the spider flange;

Figure 9 is a cross section through the flanged chart seam and the spider flange;

Figure 10 is a modified view showing the manner of fastening the ends of the chart to the spider flanges by spot welding; and Figure 11 is a modified construction of Figure 10.

The chart forming the object of this invention is adapted to be used in association with a scale which in general comprises a base 2 housing the usual lever system which supports the scale pan 4. In addition there is a chart housing 6 having a sight opening 8 on one face and another sight opening 10 on the opposite side of the casing, through which the indicia on the chart drum may be viewed. Inside of the casing and just opposite the observation openings 8 and 10 there is a sight wire 14 which should be placed as close to the outer surface of the chart drum 12 as possible. The chart housing 6 generally houses the spring suspension member connecting with a part of the lever system, the rack and pinion, and the chart rotated by the rack and pinion. The chart 12 carries on its outer surface suitable price and/or weight calculations, as is well known in the art. The chart comprises opposite spiders 16 and 18 mounted on the chart shaft 20, in turn mounted within the casing. In the present instance the charts are preferably arranged as shown in Figure 2 although other arrangements are contemplated. Therefore there are two charts on the shaft 20 and each chart includes spaced spider arms 21 and 22, 24 and 26, which are arranged to rotate with the shaft 18. Each spider has these plurality of radially disposed legs 21 and 22 or arms 24 and 26, which merge into a rim portion 30, extending at right angles to the leg portions. These portions are preferably slotted as at 38 to receive weights, if desired, to balance the scale, as is well known in the art.

As shown in Figure 5, the chart is of relatively thin gauge metal, preferably aluminum. It is preferably .004 inch thick. The ends of the chart are turned in substantially at right angles to form flanges 40 and 42. These flanged portions 40 and 42, as shown in Figure 8, terminate sufficiently short of the side marginal edges of the chart, for instance as shown at 43 in Figure 8, so that that part of the chart which overlies the flanges 30 of the spiders has no inwardly extending flanges 40 and 42 and therefore will lie flat on the outer surface of the spider flanges 30.

According to the present invention the edges of the chart, after being flanged as at 40 and 42, are held together in any desired form and are then spot welded as at 44 so that the edges are permanently united and the junction 46 of the inturned flanges will lie flat and flush with the plane of the outer wall of the chart 12.

In addition, means is provided for securing the marginal circumferential edges of the chart such as 50 and 52 to the flanges 30 and 31 of the spiders 16 and 18. This is accomplished in the present construction by forming a slot through the metal to the superimposed layers of the chart metal at the marginal edges 50 and the underlying spider flange 30 and then inwardly bending the two tongues 52 and 54 so formed, in the manner shown in Figures 3, 4, 8 and 9, so that they perform an interlock on the under side of the spider flange 30. This slotting and bending of the tongues under, as above described, preferably takes place on opposite sides of the line of the seam as shown in Figures 8 and 9, whereby the two slotted portions 52 and 54 on each side of the seam, and which unite the circumferential edges to the flange 30 of the spider, will reinforce that portion of the seam, such as 43, out to the outer edge as at 45, see Figure 8, where there are no inturned flanges 40 and 42. It is at this point that due to the absence of the spot welded flanges the chart would tend to be weak, and therefore by placing the bent-in portions 52 and 54 at each side and relatively close to the line of the seam, the seam is not only reinforced at each end but it also is firmly anchored to the spider at each end. Therefore we have the circumferential marginal edges of the chart not only secured to the underlying spider on each side of the seam, but also secured completely around the spider at spaced apart intervals as shown in Figure 7, and this securing-together is accomplished in a manner so that no projection of the metal of the chart occurs above the circumferential outer face of the chart. In fact no additional metal is added to the chart in securing it to the flanges. The spider arms 21 to 26 inclusive are provided with the usual type of slots 56 and weights slidable therealong for adjusting the balance of the chart.

In Figures 10 and 11 I have shown modified structures for adhering the circumferential edges of the chart to the spider flanges 30. Referring to Figure 10, it will be seen that at 45 the spot welded flanges 40 and 42 terminate just short of the flange 30 of the spider, while the cylindrical portions of the chart project beyond the flanges 40 and 42 in abutting relation to overlie the flange 30. In short, the flange portions 40 and 42 are cut away as at 43.

I propose to affix the circumferential edges of the chart disposed in this manner to the underlying spider flanges 30 by means of welding and particularly and specifically by means of spot welding. In the construction shown in Figure 10 the spot welding is shown at 60. Attention is called to the fact that one of the spot welds, such as 62, may be placed directly upon the line 45 where the chart edges abut beyond the flanges 40 and 42, and overlie the spider flanges 30. Such a weld 62 will not only cause the chart edges to interflow and unite, but will likewise cause them to interflow with the underlying metal of the spider flanges thereby to cause a three-way interflow which will hold the assembly securely together. The line of spot welding 60 will follow completely around the circumference of the flange 30 of the spider. By this arrangement not only will the welding 62 at the abutting edges reinforce the welded portions 70 of the flanges 40 and 42, but will also assist in securing the chart to the flanges.

In Figure 11 I have shown the spot weld 64 and 66 of the spot welding 60 as being located as close as possible to the line 45 whereby the two abutting edges are held together and to the flange by means of these spot welds. Such spot welds 64 and 66 thus not only hold the abutting edges together but also reinforce the spot weld 70 of the flanges 40 and 42 and likewise hold all to the spider flanges.

It will thus be seen that I have provided an improved method of forming a scale chart and a new chart wherein the chart has a continuous smooth surface, all portions of which are of uniform radius from the center, wherein the junction of the chart ends is of a very rugged nature due to the flanged spot welded construction.

Having thus described the invention, what I claim as new and desire to secure by Letters Patent is:

1. A scale chart for weighing scales comprising a shaft, a plurality of spiders mounted thereon, each spider having a circular flange extending at right angles therefrom to provide a rim, a chart of light gauge sheet metal encircling the spiders, the ends of the chart being flanged with the flanges extending inwardly in abutting relation, with the plane of abutment extending substantially radially of said shaft, said flanges being welded together, said flanges terminating short of the spider rims, and means for securing the circumferential opposed edges of the chart to said spider rims.

2. In a scale chart, the combination of a shaft, a plurality of spiders in spaced relation on said shaft, each spider having a circumferential flange extending parallel to the shaft, a chart of light gauge sheet metal surrounding and lying upon the flanges of said spiders to enclose the spiders, the marginal edges of the chart which overlie the spider flanges being slitted to provide slots and tongues through the metal of the chart, the spider flange having slots therein and said tongues being bent inwardly through said slots in the spider flange into overlapping locked relation interiorly of the spider flange whereby to secure the chart on said spider flanges without causing the metal of the chart to project outwardly of the outer face of the chart.

3. A chart for a scale comprising a shaft having a plurality of spiders spaced apart thereon, each spider including a circumferential rim lying parallel to the direction of the shaft and an endless chart of light gauge metal enclosing said spiders with the marginal edges of the chart overlying the rimmed flanges of the spiders, said overlying portions of the marginal portions of said chart and flanges having registering slots forming free tongues in such marginal edge portions of the chart in the spider flanges, and said tongues being bent inwardly through the registering opening formed in the spider flange and bent backwardly upon the metal of the spider flange whereby to interlock the marginal edges of the chart with the spider flange.

4. In combination, a shaft, a pair of spiders mounted on said shaft, each spider including radially extending arms merging into a circumferential rim portion which lies in a plane transverse of the plane of the arms, a light gauge metal chart encircling the spiders, with the margins thereof overlying the rim portions, the chart being a continuous cylinder and having its free ends flanged inwardly of the outer chart surface and abutted in a radial plane of said cylinder, said flanges being spot welded together, the flanged ends of the seam terminating short of the spiders, the overlying layers of marginal chart portions and underlying spider flange on each side of the seam being slotted to provide registering apertures and free tongues, said free tongues being bent inwardly into overlapping interlocking relation on the inside of the rim portion of the spider whereby securely to lock the marginal edges of the chart to the spider and whereby to insure that all portions of the chart lie at equidistance from the center of the shaft whereby to provide a smooth continuous outer wall surface for the chart.

5. A scale chart comprising a shaft and a plurality of spaced spiders thereon, each spider including a circular metallic rim of light gauge metal, and a light gauge metal chart overlying and enclosing said spiders and the flanges thereof with the circumferential marginal edges of the chart overlying the rims of the spider, said chart being formed as a continuous cylinder, said chart having its ends flanged and extending inwardly of the cylinder substantially within radial planes thereof and juxtaposed, said juxtaposed flanges being secured together by spot welding whereby the metal of the chart is fused together without adding additional metal at the junction of the seams so formed.

6. A scale chart comprising a shaft and a plurality of spaced spiders thereon, each spider including a circular metallic rim of light gauge metal, and a light gauge metal chart overlying and enclosing said spiders with the circumferential marginal edges of the chart overlying the rims of the spiders, said chart being formed as a continuous cylinder and including inwardly turned flanges disposed within the spider flanges, said flanges being juxtaposed and spot welded together, the inwardly turned-in flanges terminating short of the spiders, leaving the two edges of the chart between the point of termination of the inwardly extending flanges and the circumferential edge disposed in abutting relation, and spot welding uniting that portion of the circumferential edges of the chart which overlies the spider flange, to the spider flange, one of said spot welds being located directly at the abutting edges that overlie the spider rim whereby to weld said abutting edges together and to the spider rim and thus reinforce the inwardly turned spot welded flanges which lie between the spiders.

7. An indicia drum for scales comprising a cylindrical sheet metal body formed from a rectangular blank, two of the opposed edges of said blank having a substantially uninterrupted flange extending from a point adjacent the unflanged edges thereof across the intermediate extent of the said opposed edges, said flanges being abutted in a radial plane of said cylindrical sheet and fastened together to constitute an upstanding flange interiorly of the drum, a plurality of spiders positioned within said drum and rigidly secured thereto, said flanges cooperating with said spiders effectively to space them axially of the drum.

EDWARD C. KARP.

REFERENCES CITED

The following references are of record in the file of this patent:

UNITED STATES PATENTS

| Number | Name | Date |
|---|---|---|
| 86,571 | Miller | Feb. 2, 1869 |
| 362,107 | Penfield | May 3, 1887 |
| 431,028 | Bayles | July 1, 1890 |
| 541,621 | Langlais | June 25, 1895 |
| 575,862 | Stover | Jan. 26, 1897 |
| 625,946 | Wilmot | May 30, 1899 |
| 1,357,565 | Jacobus | Nov. 2, 1920 |
| 1,542,663 | Brenzinger | June 16, 1925 |
| 1,648,626 | Smith | Nov. 8, 1927 |
| 2,282,039 | Doogan | May 5, 1942 |